(12) United States Patent
Hidaka et al.

(10) Patent No.: US 7,601,448 B2
(45) Date of Patent: Oct. 13, 2009

(54) POLYMER ELECTROLYTE MEMBRANE AND FUEL CELL

(75) Inventors: Yasuaki Hidaka, Edogawa-ku (JP); Katsuhiko Iwasaki, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 182 days.

(21) Appl. No.: 10/183,523

(22) Filed: Jun. 28, 2002

(65) Prior Publication Data

US 2003/0044669 A1 Mar. 6, 2003

(30) Foreign Application Priority Data

Jul. 3, 2001 (JP) ............................. 2001-201797
Aug. 2, 2001 (JP) ............................. 2001-234646

(51) Int. Cl.
*H01M 8/10* (2006.01)

(52) U.S. Cl. ........................ 429/33; 429/46; 429/317; 429/306; 429/310; 429/314

(58) Field of Classification Search .................. 429/33, 429/317, 46, 306, 310, 314
See application file for complete search history.

(56) References Cited

U.S. PATENT DOCUMENTS

| | | | |
|---|---|---|---|
| 3,751,376 A | 8/1973 | Quentin | |
| 4,865,925 A | 9/1989 | Ludwig et al. | |
| 5,429,759 A | 7/1995 | Andrieu et al. | |
| 5,438,082 A | 8/1995 | Helmer-Metzmann et al. | |
| 5,561,202 A | 10/1996 | Helmer-Metzmann et al. | |
| 5,741,408 A | 4/1998 | Helmer-Metzmann et al. | |
| 5,795,668 A | 8/1998 | Banerjee | |
| 5,834,523 A | 11/1998 | Steck et al. | |
| 5,834,566 A | 11/1998 | Helmer-Metzmann et al. | |
| 5,985,477 A | 11/1999 | Iwasaki et al. | |
| 6,087,031 A | 7/2000 | Iwasaki et al. | |
| 6,248,469 B1 * | 6/2001 | Formato et al. | 429/41 |

FOREIGN PATENT DOCUMENTS

| | | | |
|---|---|---|---|
| CA | 2 328 797 A1 | 6/2001 | |
| EP | 0 309 259 A2 | 3/1989 | |
| EP | 0 932 213 A1 | 7/1999 | |
| EP | 1 113 517 A2 | 7/2001 | |
| JP | 62-252074 A | 11/1987 | |
| JP | 2-294338 | * | 12/1990 |
| JP | 4-204522 A | 7/1992 | |
| JP | 6-29032 A | 2/1994 | |
| JP | 6-271688 A | 9/1994 | |
| JP | 7-68377 B2 | 7/1995 | |
| JP | 9-194609 A | 7/1997 | |
| JP | 10-21943 A | 1/1998 | |
| JP | 10-45913 A | 2/1998 | |
| JP | 11-502249 A | 2/1999 | |
| WO | WO 96/29360 A1 | 9/1996 | |
| WO | WO 00/22684 A2 | 4/2000 | |
| WO | WO 00/51716 A1 | 9/2000 | |
| WO | WO 00/63995 A1 | 10/2000 | |

* cited by examiner

*Primary Examiner*—Laura S Weiner
(74) *Attorney, Agent, or Firm*—Sughrue Mion, PLLC

(57) ABSTRACT

A polymer electrolyte membrane having outstanding water resistance and high thermal resistance, moreover having practical strength required for use as a polymer electrolyte membrane of a solid polymer electrolyte type fuel cell at low price, and a method for producing the polymer electrolyte membrane are provided. A polymer electrolyte comprising a block copolymer comprising one or more of blocks in which sulfonic acid groups are introduced and one or more blocks in which sulfonic acid groups are not substantially introduced wherein at least one block in the block copolymer is a block having aromatic rings in polymer chain, and a porous membrane, and a fuel cell using the membrane are provided.

And moreover the present invention provides a method for producing a polymer electrolyte membrane comprising the steps of, (i) impregnating some of pores of a porous membrane with a solution (1) of a polymer electrolyte having a contact angle of less than 90° to said porous membrane, (ii) impregnating a remaining part in the pores of the porous membrane with a solution (2) of a polymer electrolyte having a larger contact angle than that of the solution (1) to said porous membrane, and (iii) removing a solvent.

15 Claims, No Drawings

POLYMER ELECTROLYTE MEMBRANE AND FUEL CELL

FIELD OF THE INVENTION

The present invention relates to a polymer electrolyte membrane, in particular, a polymer electrolyte membrane suitably used for fuel cells, and a method for producing therefore.

BACKGROUND OF THE INVENTION

In recent years, fuel cells attract attention as dean energy conversion equipment having high efficiency. Especially, since a solid polymer electrolyte fuel cell using polymer membrane having proton conductivity as an electrolyte has a compact structure, and provides high output, and it can be operated by easy system, it attracts attention as power supplies for movement in vehicles etc. As a polymer electrolyte having proton conductivity used for a solid polymer electrolyte fuel cell, perfluorosulfonic acid derived materials including Nafion (registered trademark of DuPont) has mainly been conventionally used because it has excellent characteristics as a fuel cell. However since this material is very expensive, when a power generation system using fuel cells will become wide spread from now on, its cost may become big problems. In such a situation, development of cheaper polymer electrolyte that may be replaced with above perfluorosulfonic acid derived materials has been activated in recent years. Especially, polymers in which sulfonic acid groups are introduced into aromatic polyethers is one of the most promising materials, because such polymer have outstanding heat-resisting property and high film strength. For example, a polymer electrolyte composed of random copolymers of sulfonated polyether ketones in Japanese Patent KOHYO Publication No. 11-502249, and a polymer electrolyte composed of random copolymer of sulfonated polyether sulfone are disclosed in Japanese Patent Publication Laid-Open No. 10-45913 and Japanese Patent Publication Laid-Open No. 10-21943.

While proton conductivity will generally become higher in these materials as an introduced amount of sulfonic acid group in to polymer increases, a tendency of increase in water absorption of polymer is shown, Use of a film prepared from polymer having high water absorptivity, when it is used for a fuel cell, gives a big dimensional change caused by water existing in polymer generated during use of the cell, and thereby, internal stress formed in interface with electrode induces exfoliation of membrane, and fuel cell characteristics may possibly be deteriorated.

Moreover, strength of membrane itself also falls greatly by water absorption. Moreover, it is required for a polymer electrolyte membrane used in solid polymer electrolyte fuel cells that it should have a high energy efficiency. Therefore, it is important to reduce membrane resistance of a polymer electrolyte membrane as much as possible, and it is desired for thickness to be thinner for this reason.

However, since thin thickness inevitably reduced strength of film, when a polymer electrolyte membrane was built into a solid polymer electrolyte fuel cell or water electrolysis equipment, etc., there occurred problems that the membrane might be fractured, or after incorporating the membrane, the membrane might be broken or a peripheral sealing portion of the membrane might be torn by differential pressure of both sides of the membrane.

In order to improve a membrane strength of a polymer electrolyte membrane, a technique of combining porous membranes or nonwoven fabrics with polymer electrolyte is also proposed. For example, a cation exchange membrane in which a cation exchange resin is filled into pores of porous membrane made of ultrahigh-molecular weight polyolefin is disclosed as a polymer electrolyte membrane for solid polymer electrolyte type fuel cells in Japanese Patent Application Laid-Open No. 1-22932. Besides, a cation exchange membrane in which fluorinated derived resin represented by polytetrafluoroethylene is used as a material resin of base material is disclosed in Japanese Patent Application Laid-Open No. 6-29032, and Japanese Patent Application Laid-Open No. 9-194609.

However, these composite membranes using cation exchange resins have problems in water resistance and heat resistance property of ion exchange resins, and even if completed with porous membranes and nonwoven fabrics, sufficient characteristics as a polymer electrolyte membrane for solid polymer electrolyte type fuel cells are not demonstrated.

Besides, in the above described Japanese Patent Application Laid-Open No. 1-22932, Japanese Patent Application Laid-Open No. 6-29032, and Japanese Patent Application Laid-Open No. 9-194609, a method is disclosed in which a solution of polymer electrolyte is impregnated into pores of a porous membrane, and subsequently solvent is removed, as a method of combining porous membranes and nonwoven fabrics with polymer electrolytes. However, when penetrating power of a solvent used for solution of a polymer electrolyte to porous membranes was small, the solution was hardly impregnated into pores and the combining proved to be difficult. On the other hand, although the solution is impregnated to fill pores with electrolyte when solvent having large penetrating power is used, in case where high volatility of solvent used, temperature on surface of the film becomes lower than inside of the pores due to heat of vaporization of the solvent, and thereby dew condensation will occur on the surface or convection of solution will take place within the pores. Therefore, convection marks (sometimes referred to as dull finish) may remain or deterioration of appearance of obtained composite membrane may be observed because of dew condensation. Thus, when a composite membrane has bubble and/or unevenness, and when stress is applied, bubble and concavo-convex demonstrate function as a stress concentration point, and thereby a possible damage of the composite membrane might be induced.

Besides, a method of improving penetrating power of a solvent used for solution of a polymer electrolyte, and of obtaining composite membrane by giving surface treatment to a porous membrane is also disclosed. For example, a method to conduct hydrophilizing processing by plasma etching etc. on porous fluorinated resin film (Japanese Patent Publication No. 62-252074), a method for treating a surface of a porous membrane with surface active agents (Japanese Patent Publication Laid-Open No. 04-204522), and a method for hydrophilizing process of a porous membrane by⇒ (with ?) a different polymer from polymer electrolyte used for membrane (Japanese Patent Publication Laid-Open No 6-271688) etc, are proposed.

However, a problem is brought about in which the surface of the porous membrane is hydrophilized by plasma etching processing given to a porous membrane, but strength of porous membrane itself falls. Besides, in a method of hydrophilizing with surface active agent or other polymers, a problem occurred that reduction of amount of polymer electrolyte impregnated in porous membrane significantly deteriorated fuel cell characteristics at time of being used as a polymer electrolyte membrane for solid polymer electrolyte type fuel cells.

SUMMARY OF THE INVENTION

An object of the present invention is to provide a polymer electrolyte membrane having outstanding water resistance and high thermal resistance, moreover having a practical strength required for use as a polymer electrolyte membrane of a solid polymer electrolyte type fuel cell at low price. Furthermore, another object of the present invention is to provide a method for producing a polymer electrolyte composite membrane having good appearance and moreover maintaining original physical properties as porous membrane, without using surface active agent and other polymers.

The present inventors found out that a composite membrane of a specific polymer electrolyte with a porous membrane demonstrates a practical strength used well as a polymer electrolyte membrane for solid polymer electrolyte type fuel cells. Moreover, the present inventors found out a method for producing a polymer electrolyte composite membrane having a good appearance and moreover maintaining original physical properties as porous membrane by selecting solvent having a contact angle in a specific range to a porous membrane as a solvent used for solution of polymer electrolyte.

That is, the present invention provides a polymer electrolyte membrane comprising a porous membrane, and a polymer electrolyte which comprises a block copolymer comprising one or more of blocks in which sulfonic acid groups are introduced and one or more blocks in which sulfonic acid groups are not substantially introduced wherein at least one block in said block copolymer is a block having aromatic rings in polymer chain of said block polymer; and a fuel cell using the membrane.

Besides, the present invention provides a method for producing a polymer electrolyte membrane comprising the steps of,
(i) impregnating pores of a porous membrane with a solution (1) of a polymer electrolyte whose contact angle to the porous membrane is less than 90°;
(ii) impregnating a remaining part of pore of the porous membrane with a solution (2) of a polymer electrolyte having a larger contact angle than a contact angle of the above described solution (1) to the porous membrane; and
(iii) removing solvent.

DETAILED DESCRIPTION OF THE INVENTION

In the present invention, a block copolymer is a polymer in which two or more of blocks having different repeating units are bonded directly or bonded through linkage group, and a block includes two or more repeating units. In the present invention, at least one block is a block having aromatic ring in polymer chain.

In the present invention, a block in which sulfonic acid groups are introduced is a block in which no less than 0.5 of sulfonic acid groups (group expressed with —SO$_3$H) per one repeating unit on average are bonded to any part of repeating units constituting the block Especially, a block having aromatic ring, and a block having a structure with sulfonic acid group bonded directly to the aromatic ring is preferable because it may be synthesized easilier.

On the other hand, in the present invention, a block into which sulfonic acid groups are not substantially introduced is a block in which no more than 0.1 of sulfonic acid group per one repeating unit constituting the block on average is introduced.

A block with aromatic ring introduced in polymer chain may be a block in which the above described sulfonic acid groups are introduced, or may be a block in which sulfonic acid groups are not substantially introduced, and may be both of the blocks.

In the present invention as a block in which sulfonic acid groups are introduced, for example, polystyrene, poly(α-methyl styrene), poly(allylphenyl ether), poly(phenyl glycidylether), poly(phenylene ether), poly(phenylene sulfide), poly(ether ether ketone), poly(ether ether sulfone), polysulfone, poly(phenylmethylsiloxane), poly(diphenylsiloxane), poly(phenylmethylphosphazene), poly(diphenylphosphazene), or a block in which sulfonic acid group is introduced into a block comprising a repeating unit having epoxy group are included.

Among them a block having a repeating unit represented by a following general formula [1], a block having a repeating unit represented by a following general formula [2], or a block in which sulfonic add groups are introduced into a block having epoxy group is preferably used.

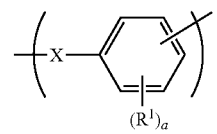

[1]

(In formula [1], X represents —O—, —S—, —NH—, or direct bond, R$^1$ represents alkyl group with carbon numbers of from one to six, alkoxy group with carbon numbers of from one to six, or phenyl group, a is integer of from 0 to three. When there are two or more R$^1$, these may be same, or may be different from each other)

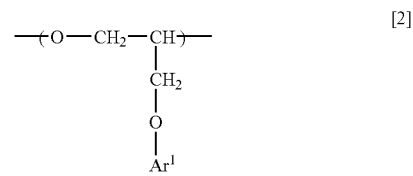

[2]

(Ar$^1$ represents a group selected from following structures in Formula [2].)

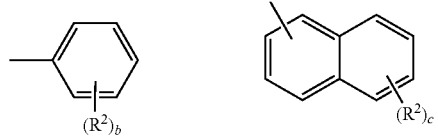

(In the above described Formulas, R$^2$ represents alkyl group with carbon numbers of from one to six, alkoxy group with carbon numbers of from one to six, phenyl group, or phenoxy group, b is an integer of 0 to four, and c is an integer of 0 to six. When there are two or more R$^2$, these may be same, or may be different from each other.)

As blocks having repeating units represented by the general Formula [1], poly(phenylene), poly(aniline), poly(phenylene ether), poly(phenylene sulfide), etc. may be mentioned. Among them in the Formula [1], poly(phenylene ether) in which X is represented by —O— is preferable, and specifically poly(1,4-phenylene ether), poly(2-methyl-1,4-phenylene ether), poly(2,6-dimethyl-1,4-phenylene ether), poly(2-phenyl-1,4-phenylene ether), poly(2,6-diphenyl-1,4-phenylene ether), poly(2-methyl-1,3-phenylene ether), poly (2,6-dimethyl-1,3-phenylene ether), poly(2-phenyl-1,3-phenylene ether), and poly(2,6-diphenyl-1,3-phenylene ether), etc. may be mentioned.

Among them, poly(1,4-phenylene ether), poly(2-phenyl-1,4-phenylene ether), and poly(2,6-diphenyl-1,4-phenylene ether) are more preferable, and poly(2-phenyl-1,4-phenylene ether) is still more preferable.

Precursors of a block having repeating units represented by the general formula [1] may be manufactured by well-known methods. For example, in poly(phenylene ether), it may be manufactured by an oxidation polymerization method in which phenol is oxidized under existence of catalyst, and by a method in which halogenated phenol is condensed under existence of catalysts and alkalis (called Ullmann reaction).

A precursor of a block means a polymer having reactive part giving a block copolymer by copolymerization reaction with other polymer having reacting part. (same hereinafter)

On the other hand, a precursor of a block having repeating units represented by the above described general formula [2], for example, may be obtained by ring opening polymerization of a glycidyl ether having an aromatic ring represented by following formula.

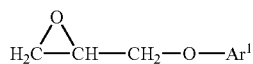

Specifically phenyl glycidyl ether, o-toluyl glycidyl ether, m-toluyl glycidyl ether, p-toluyl glycidyl ether 2,3-dimethyl phenyl glycidyl ether, 2,4-dimethyl phenyl glycidyl ether, 2,5-dimethyl phenyl glycidyl ether, 2,6-dimethyl phenyl glycidyl ether, 2,3,4-trimethyl phenyl glycidyl ether, 2,4,6-trimethyl phenyl glycidyl ether, 2,3,4,6-tetramathyl phenyl glycidyl ether, 2-ethyl phenyl glycidyl ether, 4-ethyl phenyl glycidyl ether, 2propyl phenyl glycidyl ether, 4-n-propyl phenyl glycidyl ether, 4-propyl phenyl glycidyl ether, 2-butyl phenyl glycidyl ether, 4-butyl phenyl glycidyl ether, 4-i-propyl phenyl glycidyl ether, 2-biphenyl glycidyl ether, 4-biphenyl glycidyl ether, 1-naphthyl glycidyl ether, 2-naphthyl glycidyl ether, etc. may be mentioned. These may be used independently and may be used as a copolymer using a plurality of glycidyl others.

Besides, it is also possible to use a precursor of a block obtained by copolymerizing glycidyl ethers having the above described aromatic ring, and epoxy compounds not including aromatic ring if needed.

As epoxy compounds that do not include aromatic ring, for example, ethylene oxide, propylene oxide, 1,2-epoxy butane, cyclohexane epoxide, epifluorohydrin, epichlorohydrin, epibromohydrin, trifluoro propylene oxide, methyl glycidyl ether, ethyl glycidyl ether, propyl glycidyl ether, butyl glycidyl ether, etc. may be mentioned.

When using polymer or copolymer of above epoxy compound as one component of a precursor of a block, a high ratio of epoxy component may deteriorated the thermal resistance of a resulted block copolymer, and therefore glycidyl ether component having an aromatic ring is preferably no less than 60% by weight, and more preferably no less than 80% by weight.

As ring opening polymerization of glycidyl ethers having aromatic rings, or of the glycidyl ethers and epoxy compounds not including aromatic rings, many methods are known and each of these well-known polymerization methods may be used. A number of repeating units represented by the general formula [2] is preferably from two to 200, and more preferably is from five to 50.

On the other hand, the above-described block having epoxy groups is obtained from polymer having one or two or more of epoxy groups as a precursor of a block. However, even if a polymer having epoxy groups is not used as a precursor of a block, a block having epoxy groups may include a block in a block copolymer having a epoxy groups as a result.

In blocks obtained from polymers having epoxy groups, a block comprising polymer having epoxy groups with aromatic rings in polymer chain is more preferable, and it is still more preferable that it is a block having repeating units represented by a following general formula [3].

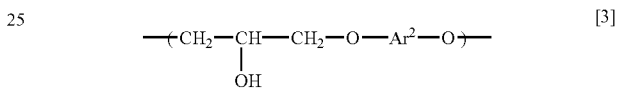

In Formula [3], $Ar^2$ represents a group selected from following structures.

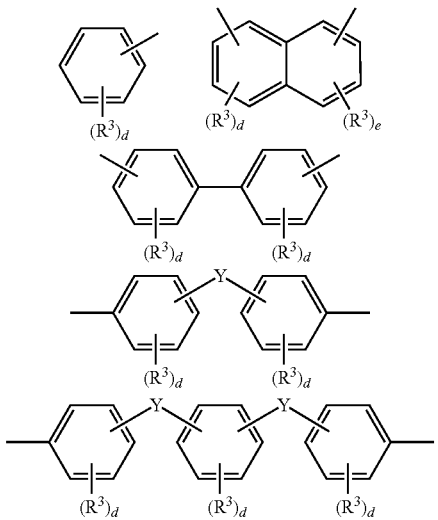

(In the above-described formulas, $R^3$ represents alkyl group with carbon numbers of from one to six, alkoxy group with carbon numbers of from one to six, or phenyl group, d is an integer of from 0 to three and e is an integer of from 0 to two. When there are two or more $R^3$, these may be same, or may be different from each other. Y represents —O—, —S—, alkylene group with carbon numbers of from one to 20, halogenated alkylene group with carbon numbers of from one to 10, or alkylene dioxy group with carbon numbers of from one to 20. When there are two or more Y, these may same, or may be different from each other.)

Polymers having repeating units represented by the general formula [3] is synthesized by well-known synthetic methods.

As the above described synthetic methods, a method in which diol compounds represented by HO—Ar²—OH is reacted with epichlorohydrin under existence of alkali, and a method in which diol compounds and diglycidylether compounds are reacted may be mentioned.

As diol compounds represented by HO—Ar₂—OH, specifically, hydroquinone, resorcinol, catechol, 1,2-dihydroxy naphthalene, 1,4-dihydroxy naphthalene, 1,5-dihydroxy naphthalene, 2,6-dihydroxy naphthalene, 2,7-dihydroxy naphthalene, 4,4'-dihydroxy biphenyl, 2,4'-dihydroxy biphenyl, 2,2'-dihydroxy biphenyl 4,4'-dihydroxy diphenylmethane, 1,1-bis(4-hydroxy phenyl)ethane, 2,2-bis(4-hydroxy phenyl)propane, 2,2-bis(4-hydroxy phenyl)butane, 1,1-bis(4-hydroxy phenyl)cyclohexane, 2,2-bis(4-hydroxy phenyl)-1,1,1,3,3,3-hexa fluoro propane, 1,1-bis(4-hydroxy phenyl)-1-phenyl ethane, bis(4-hydroxy phenyl)diphenylmethane, 9,9-bis(4-hydroxy phenyl)fluorene, α, α'-bis(4-hydroxy pheny)-1,4-diisopropyl benzene, 4,4'-dihydroxy diphenyl ether, 2,2'-dihydroxy diphenyl ether, bis(4-hydroxy phenyl)sulfide, bis(2-hydroxy phenyl)sulfide, 1,2-bis(4-hydroxy phenyl)ethane, 1,2-bis(4-hydroxy phenoxy)ethane, 1,2-bis(3-hydroxy phenoxy)ethane, 1,2-bis(4-hydroxy phenoxy)propane, 1,3-bis(4-hydroxy phenoxy)propane, 1,4-bis(4-hydroxy phenoxy)butane, 1,6-bis(4-hydroxy phenoxy)hexane, diethyleneglycol bis(4-hydroxy phenyl)ether, etc. may be mentioned.

A number of repeating units composed of blocks obtained from polymers with repeating units represented by the general formula [3] is preferably from two to 200, and more preferably from four to 50.

Although a polymer electrolyte in the present invention comprises a block copolymer which has one or more of the above described blocks in which sulfonic acid groups are introduced, and blocks in which sulfonic acid groups are not substantially introduced respectively, As blocks in which sulfonic acid groups are not substantially introduced, a block comprising aromatic polyethers having repeating units represented by a general formula [4] is preferable because of its high thermal resistance.

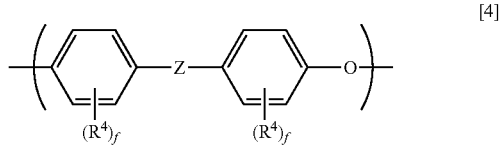

[4]

In the general formula [4], $R^4$ represents alkyl group with carbon numbers of from one to 6, and f is an integer of from 0 to four, When there are two or more $R^4$, these maybe same, or may be different from each other. Z represents —CO— or —SO₂—.

Blocks comprising polyether ketones, blocks comprising polyether sulfones may be illustrated.

Eapecially polyether sulfones in which Z is —SO₂— in the general formula [4] is preferable because of its high solubility to solvents Polyether sulfone that is an example of a precursor of blocks shown in the general formula [4] may be synthesized by polycondensation of 4,4'-dihydroxy diphenyl sulfone and 4,4'-dichloro diphenyl sulfone.

A weight-average molecular weight of the precursor of the block obtained from polyether sulfone is preferably from 2000 to 500000, and more preferably from 8000 to 100000. When the molecular weight is smaller than 2000, a film strength and thermal resistance of copolymer may decrease, and when the molecular weight is larger than 500000, solubility may be small.

A method for producing a polymer electrolyte of the present invention will be hereinafter described.

There is in particular no limitation in methods for producing block copolymers by chemically bonding precursors of two or more kinds of blocks, and any suitable well-known methods for combining each block may be used.

For example, in the case where poly(phenylene ether) that is an example of a precursor of a block shown by the general formula [1] as repeating unit, and polyether sulfone that is an example of a precursor of a block shown by the general formula [4] as repeating unit are copolymerized, a method of condensing poly(phenylene ether) having hydroxyl groups remaining at the end of the polymer chain, and polyether sulfone having halogens remaining at the end of the polymer chain under existence of alkali may be illustrated. Besides, when polylphenylene ether) having hydroxyl groups remaining at the end of the polymer chain, and polyether sulfone having hydroxyl groups remaining at the end of the polymer chain are copolymerized, copolymerization may be conducted by a similar condensation reaction using dihalogenated compounds such as 4,4'-difluoro benzophenone or 4,4'-dichloro diphenyl sulfone as a linking agent for combining poly(phenylene ether) and polyether sulfone to obtain block copolymer.

On the other hand, when bonding poly(phenyl glycidyl ether) that is an example of a precursor of a block shown by the general formula [2] as repeating unit, and polyether sulfone that is an example of a precursor of a block shown by the general formula [4] as repeating unit, copolymerization may be conducted by converting end hydroxyl groups, which exist at the end of the polymer chain of polyether sulfone, into metal phenolate, by conducting ring opening polymerization of glycidyl ether including aromatic ring at the alkali metal phenolate as a polymerization starting point, and subsequently by conducting sulfonation.

Besides, a method may be mentioned in which a precursor of a block is prepared by reacting phenyl glycidyl ether with glycidyl ethers having halogen usable for blocking reaction such as epiehlorohydrin, and then obtained precursor of a block is condensed with polyether sulfones with hydroxyl group remaining at the end of the polymer chain under existence of alkali etc.

Moreover, when polyether sulfone that is an example of a precursor of a block is bonded with an example of a precursor of a block shown by the general formula [3] as a repeating unit, a method may be mentioned in which a hydroxyl group remaining at the end of a polyether sulfone is reacted by a ring opening addition reaction with a glycidyl group remaining at the end of a polymer having epoxy group.

Although it is possible for block copolymerization to be conducted in a molten state without solvent when using polyether sulfone as one of precursors of a block, it is preferable to conduct the reaction in suitable solvent. Although as a solvent, aromatic hydrocarbons, ethers, ketones, amides, sulfones, and sulfoxides etc. may be used, amides are preferable because of high solubility of polyether sulfone to amides. As amides, N,N-dimethylformamide, N,N-dimethylacetamide, N-methylpyrolidone, etc. may be mentioned.

A reaction temperature of block copolymerization reaction is preferably 20° C. to 250° C., and more preferably it is 50° C. to 200° C.

In a block copolymer used for the present invention, it is preferable that block in which sulfonic acid groups are not substantial introduced is preferably 60 to 95% by weight of the block copolymer, and more preferably it is 70 to 90% by weight. When a block in which sulfonic acid groups are not substantially introduced is more than 95% by weight, since sulfonic acid equivalent in the block copolymer is small after introduction of sulfonic acid group, sufficient performance as a polymer electrolyte may not be obtained, and when less than 60% by weight, water resistance of the block copolymer after introduction of sulfonic acid group may be insufficient.

In a block copolymer used for the present invention, although a method of introducing sulfonic acid groups into a specific block is not limited, the following methods may be illustrated; (a) a method in which a precursor of a block with sulfonic acid groups introduced beforehand and a precursor of a block in which sulfonic acid groups are not substantially introduced are copolymerized, (b) a method in which a copolymer comprising a block in which sulfonic acid groups are to be introduced, and a block in which sulfonic acid groups are not to be substantially introduced is produced, and then sulfonic acid is selectively introduced into the block of this copolymer into which sulfonic acid groups are to be introduced. In a precursor of a block in which sulfonic acid groups are introduced, since the sulfonic acid group may prevent copolymerization reaction, a method of above described (b) is preferable.

In the above described method (a), a precursor of a block in which sulfonic acid groups are introduced may be prepared by sulfonating a precursor of a block. As sulfonating agents, well-known sulfonating agents, such as sulfuric acid which has no less than 90% of concentration, fuming sulfuric acid, chlorosulfonic acid, and $SO_3$ may be used.

In the above described method (b), as a method of selectively introducing sulfonic acid groups into a copolymer, a method (c) may be mentioned in which a functional group that exists in a block in which sulfonic acid groups are introduced, and does not exist in a block in which sulfonic acid groups are not substantially introduced is available. Besides, as other methods, a method may be proposed in which (d) difference in reactantivity to sulfonation reaction between a block in which sulfonic acid groups are introduced and a block in which sulfo groups are not substantially introduced is utilized.

For example, when a sulfonation reaction is electrophilic reaction, when sulfonation is conducted by concentrated sulfuric acid using a block copolymer comprising a block having aromatic rings that is easy to be suffered from electrophilic reaction, and a block having aromatic rings that may not be suffered from electrophilic reaction easily, a former block will be selectively sulfonated.

As a practical example the above described method (d), a method for producing a polymer electrolyte comprising the steps of, reacting the above described precursor of a block having repeating units represented by the general formula [1], [2], or [3] with a precursor of a block having repeating units represented by the general formula [4] to produce a block copolymer, and subsequently sulfonating the copolymer.

For example, in sulfonation reaction of an aromatic ring using sulfuric acid as a sulfonation agent, it is recognized that an aromatic ring of a block having repeating units represented by the general formula [4] has a low reactivity as compared with an aromatic ring of a block having repeating units represented by the general formula [1], [2], or [3].

Therefore, a block copolymer obtained by reacting a precursor of a block having repeating units represented by the general formula [4] and a precursor of a block having repeating units represented by the general formula [1], [2], or [3] is sulfonated with sulfuric acid under suitable conditions, and thereby a block copolymer in which sulfonic acid groups are selectively introduced into blocks having repeating units represented by the general formula [1], [2], or [3], and sulfonic acid groups are not substantially introduced to a block shown by the general formula [4] may be manufactured.

In a step introducing sulfonic acid groups by sulfonation reaction, as sulfonating agents, well-known sulfonating agent such as sulfuric acid with concentration of no less than 90%, fuming sulfuric acid, chlorosulfonic acid, $SO_3$, etc. may be used. Among these, sulfuric acid with concentration of no less than 90% is preferable, and sulfuric acid of from 94 to 99% by weight of concentration is more preferable.

In addition, a little amount of organic solvents that do not participate in sulfonation reaction may be added with sulfuric acid so that sulfonation reaction of the block copolymer proceeds in homogeneous system.

Dissolution to sulfuric acid and sulfonation of the block copolymer proceed simultaneously, and at room temperature, the reaction is usually completed in two to 20 hours to give uniform solution. Resulting sulfonated block copolymer is recovered by pouring the obtained sulfuric acid solution into a large amount of water.

A concentration of the block copolymer to sulfuric acid is preferably from one to 50% by weight, and more preferably from five to 30% by weight. Besides, a reaction temperature is preferably from 0 degree C. to 80° C., and more preferably is from 20° C. to 40° C.

A polymer electrolyte is thus obtained. And also a polymer electrolyte in the present invention may include additives used for usual polymer, such as plasticizer, stabilizer, and releasing agent. Besides, a structure of intermolecular cross linkage may be introduced in a polymer electrolyte.

In addition, any precursor of a block having repeating units represented by the general formulas [1] to [4] is cheap material whose synthetic technology is already established and is used in large quantities. Copolymers obtained by using the precursor as a raw material and further sulfonated is also very cheap as compared with fluorine derived materials, such as Nafion.

Porous membranes used in the present invention are used for further improvement in strength, plasticity, and durability of polymer electrolyte membranes by being complexed with polymer electrolytes. Therefore, although it may be used in any forms made of any material as for as it satisfies the above described purpose of use, from viewpoint of using well as a polymer electrolyte membrane of solid polymer electrolyte type fuel cell, a membrane thickness is from one to 100 µm, preferably from three to 30 µm and more preferably from five to 20 µm; pore size is from 0.01 to 10 µm, preferably from 0.02 to seven µm; and a porosity is from 20 to 98%, and preferably from 30 to 95%. When a membrane thickness of the porous membrane is too thin, an effect of reinforcement on a strength after combined or reinforcement effects, such as providing flexibility or durability, will become inadequate and easy to leak gas (cross leak). When a membrane thickness is too thick, electric resistance becomes higher and obtained composite membrane is not desirable as a polymer electrolyte membrane of solid polymer electrolyte fuel cell. On the other hand, when a pore size is too small, impregnation of polymer electrolyte into pore membrane may become insufficient, and when too large, reinforcement effect to polymer electrolytes may become weak, when porosity is too small, resistance as a polymer electrolyte membrane will become larger, and when too large, generally strength of porous membrane itself will become poor, and reinforcement effect will not be acquired.

As quality of materials of a porous membrane, from viewpoint of thermal resistance and reinforcement effect of physical strength, aliphatic polymers or fluorine polymers are desirable.

As aliphatic polymers suitably used, polyethylene, polypropylene, ethylene propylene copolymer, etc. may be illustrated. Polyethylenes used for the present invention include, for example, copolymers of ethylene and other monomers as well as ethylene homopolymer. Specifically, copolymers of ethylene and a-olefins referred to as linear low density polyethylene (LLDPE) are included. Besides, polypropylenes include, for example, propylene block copolymers, random copolymers, etc. (these are copolymers of ethylene, 1-butene, etc.)

Besides, as fluorinated derived polymers, well-known thermoplastic resins having at least one carbon-fluorine bond in molecule may be used without any limitation. Usually, resins having a structure where all or most of the hydrogens of aliphatic derived polymer are substituted by fluorine atoms are suitably used.

Fluorinated resins, for example, may be poly(trifluoroethylene), poly(tetrafluoroethylene), poly(chloro trifluoroethylene), poly(tetrafluoroethylene-hexafluoropropylene), poly(tetrafluoroethylene-perfluoro allylether), poly(vinylidene fluoride), etc., but the present invention is not limited by them. Among them, in the present invention, poly(tetrafluoroethylene) and poly(tetrafluoroethylene-hexafluoropropylene) are preferable, and poly(tetrafluoroethylene) is more preferable. From viewpoint of excellent mechanical strength, fluorinated resins having an average molecular weight of not less than 100000 are preferable.

A polymer electrolyte membrane of the present invention is a polymer electrolyte membrane in which the above described polymer electrolyte and the above described porous membrane are combined. As combining methods, for example; a method in which a porous membrane is impregnated into a polymer electrolyte solution, the porous membrane is taken out, and then solvent is evaporated to obtain a composite membrane; a method in which a polymer electrolyte solution is applied to a porous membrane, and then solvent is evaporated to obtain a composite membrane; a method in which a polymer electrolyte solution is contacted to a porous membrane under reduced pressure, then the pressure is returned to ordinary pressure to impregnate the solution into the porous membrane pore, and subsequently solvent is evaporated to obtain a composite membrane etc. may be illustrated. Above all, since a polymer electrolyte composite membrane having good appearance and maintaining physical properties of an original porous membrane may be produced, a method comprising, (i) a step in which pores of a porous membrane is impregnated with solution (1) of a polymer electrolyte having a contact angle of less than 90° to the porous membrane, (ii) a step in which a remaining part of pore of the porous membrane is impregnated with a solution (2) of a polymer electrolyte having a larger contact angle than a contact angle of the above described solution (1) to the porous membrane, and (iii) a step in which a solvent is removed, is desirable.

As the filling method of a polymer electrolyte, a method is adopted in which after a solution with a polymer electrolyte dissolved in a solvent is impregnated into a porous membrane, the solvent is removed. As methods of impregnating, a method in which the solution is applied or sprayed to the porous membrane may be adopted, or a method in which porous membrane is immersed in the solution may be adopted. Besides, any of methods such as heating, reducing pressure, air-drying, and combination of these may be used as methods of removing solvent.

A solvent of the polymer electrolyte solution (1) in step (i) will not be limited in particular, if it is a solvent in which a contact angle of the polymer electrolyte solution (1) to the porous membrane gives less than 90° when the electrolyte is dissolved. As these solvents, for example, solvents containing chlorine, such as dichloromethane, chloroform, 1,2-dichloroethane, chlorobenzene, and dichlorobenzene; alcohols, such as methanol, ethanol, and propanol; and mixtures of two or more kinds of these solvents may be used.

Moreover, filling of an electrolyte in this step is conducted so that part of pore of a porous membrane may remain not filled with an electrolyte. The amount of filling is usually less than 80% in volume of the pores, preferably less than 60%, and more preferably less than 40%. When too large number of filling is conducted in this step, filling in following step will become difficult.

As solvent of solution (2) of polymer electrolyte in step of (ii), when an electrolyte is dissolved, a solvent giving a larger contact angle of a solution (2) of polyelectrolyte to the porous membrane than a contact angle of a solution (1) of polyelectrolyte used in step (i) is used. More preferably, a solvent giving a contact angle of no less than 90° to a porous membrane of solution (2) of polymer electrolyte is preferable.

Moreover, if water still remain in a combined membrane after removing solvent, a combined membrane with poor appearance may be obtained, because the combined membrane have bubbles, unevenness and low strength. Therefore when a solvent which easily absorbs water in air is used, a boiling point of the solvent is preferably no less than 110° C., and more preferably no less than 120° C.

As such solvents, aprotic polar solvents, such as N,N-dimethylformamide, N,N-dimethylacetamide, N-methyl-2-pyrrolidone, and dimethyl sulfoxide, may be suitably used.

In addition, once some of pores of a porous membrane is filled with a polymer electrolyte in step (i), a surface energy of the porous membrane partly filled with the polymer electrolyte may be raised, and therefore, a contact angle to the porous membrane of solution (1) and (2) of the polymer electrolyte is beforehand measured in the state where the pores of the porous membrane is not filled with the polymer electrolyte.

Moreover, the step (ii) is preferably carried out on supporting materials. By using supporting materials at the time of solvent removal, a solvent is volatilized from an opposite side of surface of the porous membrane to that touches with the supporting material, and while the solvent is being removed, the supporting material continuously soaks up the polymer electrolyte solution by capillary action. Thus, a combined membrane comprising the porous membrane and the polymer electrolyte may be obtained in a state where the pores of the porous membrane are nearly completely filled with the polymer electrolyte.

It is preferable that a surface energy of such a supporting material is no less than 20 dyne/cm, more preferably no less than 40 dyne/cm, and still more preferably no less than 50 dyne/cm. Filling of the polymer electrolyte solution between the porous membrane and the supporting materials is preferably conducted more quickly as a surface energy becomes larger.

Moreover, as an example of supporting materials, plastic films such as polyethylene terephthalate (PET) films, metals and glasses may be suitably used. When a polymer electrolyte membrane of the present invention is used for fuel cell, there is in particular no limitation in thickness of the polymer electrolyte membrane, but the thickness is preferably from three to 200 μm, and more preferably from four to 100 μm, and still more preferably from five to 50 μm. When a thickness of the polymer electrolyte membrane is too small, a film strength that bears to practical use may not be obtained, and on the other hand, electric resistance will become high when a membrane thickness is too large, and then a polymer electrolyte membrane preferably used for a solid polymer electrolyte fuel cell may not be obtained. A polymer electrolyte membrane thickness is controllable by selecting appropriately a thickness of porous membrane, a polymer electrolyte solution concentration, or an applying thickness of polymer electrolyte solution applied to the porous membrane.

A fuel cell of the present invention will be hereinafter described.

A fuel cell of the present invention is obtained using a polymer electrolyte membrane provided by the present invention, and manufactured by joining catalyst and conductive material as a current collector to both sides of the above described polymer electrolyte membrane.

As the catalysts, as long as it is a catalyst that can activate oxidation-reduction reaction with hydrogen or oxygen, there will be in particular no limitation, and well-known catalysts may be used, and moreover it is preferable to use fine particle of platinum. Fine particles of platinum are preferably used in a state where they are carried on carbon with a shape of particle or fiber, such as activated carbon and graphites.

Also in conductive materials as a current collector, although well-known materials may be used, since they can efficiently convey raw material gas to catalysts, porous carbon woven fabrics or carbon papers are preferable. As methods of joining platinum fine particles or carbon carrying platinum fine particles to porous carbon textile fabrics or carbon papers, and methods of joining them to a polymer electrolyte film, well-known methods, for example, a method indicated in J. Electrochem. Soc.: Electrochemical Science and Technology, 1988 and 135 (9), 2209 etc, may be used.

EXAMPLE

The present invention will be described referring to Examples hereinafter, however the present invention is not limited at all by these examples.

Contact Angle Measurement

A contact angle meter CA-DT-A type manufactured by KYOWA INTERFACE SCIENCE CO., LTD. was used, and a contact angle to base material of a liquid drop was measured.

Proton Conductivity Measurement

Proton conductivity measurement was carried out by alternating current impedance method under a conditions of 80° C. and 90% RH in high temperature humidistat using SI 1260 type IMPEDANCE/GAIN-PHASE ANALYZER, manufactured by Solartoron Co., Ltd., and SI 1287 type potentiostat (ELECTROCHEMICAL INTERFACE, manufactured by Solartoron Instrument). Unit is S/cm.

An Impregnated Amount Measurement of Polymer Electrolyte in a Porous Membrane

Section was observed about a composite membrane of a porous membrane and a polymer electrolyte membrane using FE-SEM S900 Hitachi LTD., and FE-SEM-EDX analysis (field emission type scanning electron microscope-energy dispersion X ray analysis) was conducted about sulfur atom in the section. Numbers of sulfur atoms were counted in a portion of polymer electrolyte layers which are on the both surfaces of a composite membrane and in a portion where a polymer electrolyte was combined with a porous membrane. When the numbers of counts of sulfur atoms were corrected in consideration of porosity of the porous membrane, if both of the counts were almost the same, it was judged that the polymer electrolyte was filled in the pores.

Water Absorption Measurement

A polymer electrolyte membrane was dipped into ion-exchanged water, and was boiled at 100° C. for 2 hours, and subsequently the polymer electrolyte membrane was removed out of ion exchange water. After surface water was wiped off, ware absorption was measured by following equation using HR73 type halogen aquameter (Halogen Moisture Analyzer, manufactured by METTLER TOLEDO).

Moisture content=100×((weight of film with water absorbed)−(weight of dried film))/(weight of dried film)

Evaluation of Fuel Cell Characterization

Platinum catalyst carried by fibrous carbon and porous carbon woven fabrics as current collector were joined to both sides of a polymer electrolyte membrane. Humidified oxygen gas was supplied to one side of this unit, and humidified hydrogen gas to another side to evaluate power generation characteristics of this joined body.

Manufacturing Example 1

Manufacturing Example of Polymer Electrolyte (P1)

Anhydrous cuprous chloride 99 mg, and 2-methyl benzoxazole 266 mg were stirred in toluene 1 ml at room temperature under atmospheric condition for 15 minutes. 2-Phenylphenol 8.5 g and toluene 30 ml were added to the mixture, and stirred at 50° C. under oxygen atmosphere for five hours. Resulting mixture was poured into methanol including hydrochloric acid after completion of reaction, and a polymer was precipitated. The polymer was filtered and dried to obtain poly(2-phenylphenylene ether) (referred to as PE1, hereinafter).

To a flask equipped with azeotropic distillation equipment Sumika Excel PES5003P (polyether sulfone with hydroxyl end groups, manufactured by Sumitomo Chemical Co., Ltd.) 3.0 g, PE10.75 g, potassium carbonate 0.04 g, N,N-dimethylacetamide (referred to as DMAc hereinafter) 15 ml, and toluene 3 ml were added. Mixture obtained was heated and agitated, and after water was removed off under azeotropic condition of toluene and water, toluene was distilled off. 4,4'-difluorobenzophenone 0.05 g was added, and heating and agitation were carried out at 160° C. for five hours. Reaction liquid obtained was pored into a large quantity of acidic methanol with hydrochloric acid, obtained precipitate was recovered by filtration, and dried under reduced pressure at 80° C. to obtain a block copolymer 3.8 g.

The obtained block copolymer 2 g was stirred at room temperature with 20 ml of 98% sulfuric acid to obtain a uniform solution, and subsequently stirring was continued for further two hours. Obtained solution was pored into a large quantity of iced water, and obtained precipitate was recovered by filtration. Washing by mixer with ion-exchanged water was further repeated until washing liquid showed neutral, and drying at 40° C. under reduced pressure was given to obtain a sulfonated block copolymer. Hereinafter, the polymer electrolyte may be referred to as (P1).

Manufacturing Example 2

Manufacturing Example of Polymer Electrolyte (P2)

Using same catalyst as manufacturing example 1, using chlorobenzene as solvent, oxidation polymerization of 2-phenylphenol 12.25 g and the 4,4'-dihydroxy biphenyl 1.49 g as monomers was carried out to obtain poly(2-phenylphenylene ether) (referred to as PE2 hereinafter) having hydroxyl groups at both ends.

Into a flask equipped with azeotropic distillation equipment, Sumika Excel PES5003P 50 g, potassium carbonate 0.36 g, DMAc 180 ml, and toluene 25 ml were added. Under nitrogen, and after heating and stirring were continued for two hours and water was removed under azeotropic condition of toluene and water, toluene was evaporated off. 4,4'-difluoro benzophenone 9.5 g was added, and heating and stirring were continued at 160° C. for five hours. Resultant reaction liquid was pored into a large quantity of methanol, and generated precipitate was recovered by filtration. After resultant precipitate was stirred and washed with a large quantity of heated and refluxed acetone for five hours, removed out of acetone, and dried under reduced pressure at 80° C. to obtain a 45 g of polyether sulfone fluorinated at polymer chain ends.

Into a flask equipped with azeotropic distillation equipment, PE2 0.75 g, potassium carbonate 0.03 g, DMAc 15 ml, and toluene 3 ml were added. Distillation removal of the toluene was carried out after water was removed under azeotropic condition of toluene and water. Polyether sulfone fluorinated at polymer chain ends obtained above 3 g was added, and heating and stirring were carried out at 160° C. for five hours. Reaction liquid obtained was pored into a large quantity of acidic methanol with hydrochloric acid, obtained precipitate was recovered by filtration, and dried under reduced pressure at 40° C. to obtain a block copolymer 3.6 g.

Block copolymer obtained was sulfonated by a same method as in Manufacturing Example 1 using 98% sulfuric acid to obtain a surfonated block copolymer. Hereinafter, the polymer electrolyte may be referred to as (P2).

Manufacturing Example 3

Manufacturing Example of Polymer Electrolyte (P3)

Anhydrous cuprous chloride 99 mg, and N,N,N',N'-tetramethyl-1,3-propanediamine 65 mg were stirred in chlorobenzene 5 ml at room temperature under atmospheric condition for 15 minutes. Into the mixture, 2,6-diphenyl phenol 4.43 g, 4,4'-dihydroxybiphenyl 0.37 g, and chlorobenzene 15 ml were added, and the solution was stirred at 60° C. under oxygen atmosphere for five hours. After completion of reaction, the resulting solution was poured into methanol including hydrochloric acid, a polymer was precipitated, and then filtered and dried to obtain poly(2,6-diphenylphenylene ether) having hydroxyl groups at both ends (hereinafter referred to as PE 3).

Using Sumika Excel PES5003P 8.0 g, PE3 2.0 g, potassium carbonate 0.2 g, 4,4'-difluoro benzophenone 0.26 g, DMAc 50 ml, and toluene 5 ml, the same reaction as Manufacturing Example 1 was conducted to obtain a block copolymer 9.8 g. Resulting block copolymer was sulfonated with 98% sulfuric acid to obtain a sulfonated block copolymer. Hereinafter, this polymer electrolyte may be referred to as (P3).

Manufacturing Example 4

[Manufacturing Example of 2% by Weight Solution of Polymer Electrolyte (P1)]

A mixed solvent of chloroform/methanol=70/30 (weight ratio) was prepared, and the resultant mixed solvent and polymer (P1) were mixed to prepare a 2% by weight solution. Hereinafter, this solution is referred to as (X). A boiling point of chloroform is 62° C. and a boiling point methanol is 65° C. When the solution (X) was dropped on a porous membrane, a contact angle to the porous membrane of the liquid drop gave 25°.

Manufacturing Example 5

[Manufacturing Example of 15% by Weight Solution of Polymer Electrolyte (P1)]

N,N-dimethylacetamide was mixed with polymer (P1), and 15% by weight solution was prepared. Hereinafter, this solution is referred to as (Y). A boiling point of DMAc is 165.5° C. When the solution (Y) was dropped on a porous membrane, a contact angle to the porous membrane of the liquid drop was 120°.

Example 1

Manufacture of a polymer electrolyte membrane obtained by combining the polymer electrolyte (P1) with a polyethylene porous membrane.

P1 was dissolved in N,N-dimethylacetamide (hereinafter referred to as DMAc) by a concentration of 15% by weight, and the solution was applied on a polyethylene porous membrane (9 μm of membrane thickness, 36% of porosityo, 0.04 μm of pore size) currently fixed on a glass plate. Solvent was dried under ordinary pressure and a target polymer electrolyte membrane was obtained.

Example 2

Manufacture of a polymer electrolyte membrane obtained by combining the polymer electrolyte (P1) and a polytetrafluoroethylene porous membrane.

P1 was dissolved in a methanol/dichloromethane mixed solvent by a concentration of 15% by mass, and the solution was applied on a polytetrafluoroethylene porous membrane (15 μm of membrane thickness, 90% of porosity, 3.0 μm of pore size) currently fixed on a glass plate. Solvent was dried under ordinary pressure and a target polymer electrolyte membrane was obtained.

Examples 3 and 4

Manufacture of a polymer electrolyte membrane obtained by combining of the polymer electrolyte (P2) or (P3) and a polytetrafluoroethylene porous membrane.

By a same procedure as in Example 2, a polymer electrolyte membrane obtained by combining the polymer electrolyte (P2) and a polytetrafluoroethylene porous membrane, or a polymer electrolyte membrane obtained by combining the (P3) and a polytetrafluoroethylene porous membrane were prepared.

Comparative Example 1

Manufacture of Membrane Comprising the Polymer Electrolyte (P1).

P1 was dissolved in DMAc by concentration of 15% by mass, and it was flowed wide spread on a glass plate. Solvent was dried under ordinary pressure and a target polymer electrolyte membrane was obtained.

Comparative Examples 2 and 3

Manufacture of Membranes Comprising Polymer Electrolyte (P2) or (P3).

By a same procedure as in comparative example 1, the polymer electrolyte P2 or PS was dissolved in DMAc by concentration of 15% by mass, and it was flowed wide spread on a glass plate. Solvent was dried under ordinary pressure and a target polymer electrolyte membrane was obtained.

Polymer electrolyte membranes obtained in examples 1 to 4 and comparative examples 1 to 3 were measured for a proton conductiveity and a water absorption. Results were summarized in following Table 1.

TABLE 1

| | Polymer electrolyte | Porous membrane material | Proton conductivity (S/cm) | Water absorption (%) |
|---|---|---|---|---|
| Example 1 | P1 | Polyethylene | $4.7 \times 10^{-2}$ | 38 |
| Example 2 | P1 | Polytetrafluoroethylene | $8.5 \times 10^{-2}$ | 60 |
| Comparative example 1 | P1 | Not used | $1.0 \times 10^{-1}$ | 79 |
| Example 3 | P2 | Polytetrafluoroethylene | $7.2 \times 10^{-2}$ | 49 |
| Comparative example 2 | P2 | Not used | $8.4 \times 10^{-2}$ | 63 |
| Example 4 | P3 | Polytetrafluoroethylene | $4.3 \times 10^{-2}$ | 30 |
| Comparative example 3 | P3 | Not used | $5.1 \times 10^{-2}$ | 38 |

Polymer electrolyte membranes obtained in examples 1 to 4 were evaluated for fuel cell characteristics. Cycle of operation and stop operation was repeated and evaluation was continued for one week. As a result, neither deterioration of fuel cell characteristic, nor gas leak were observed.

On the other hand, when polymer electrolyte membranes obtained in comparative examples 1 to 3 were evaluated for same fuel cell characteristics, and after one week, gas leak was observed in an cases, and deterioration of characteristics was also observed.

Example 5

[Manufacturing Example of a Polymer Electrolyte Obtained by Combining the Polymer Electrolyte (P1) and a Polytetrafluoroethylene Porous Membrane.]

A polytetrafluoroethylene porous membrane (15 μm of membrane thickness, 90% of porosity, 3.0 μm of pore size) was used as a porous membrane. The porous membrane was fixed on a glass plate. A surface energy of the glass plate showed no less than 20 dyne/cm. The solution (X) was dropped on a porous membrane, and the solution (X) was applied uniformly wide spread on the porous membrane using a wire coater. At this time, the polymer electrolyte solution impregnated into the porous membrane, reached on a backside of the glass plate, and the opaque porous membrane was observed to be transparent. Solvent was air-dried. The porous membrane was observed opaque again. Then, the solution (Y) was dropped on the porous membrane, and the solution (Y) was uniformly applied wide spread on the porous membrane using a wire coater. At this time, the polymer electrolyte solution impregnated into Teflon (R) porous membrane covered with the polymer electrolyte, reached on a back side of the glass plate, and the Teflon (R) porous membrane was observed to be transparent. Furthermore, the solution (Y) was dropped and a coating thickness was controlled using a bar coater having a clearance of 0.2 mm. The membrane was dried under ordinary pressure at 80° C. The membrane was then dipped in 1 mol/L of hydrochloric acid, and a polymer electrolyte composite membrane was obtained by subsequently washing with ion exchange water.

Comparative Example 4

Using a same polytetrafluoroethylene porous membrane as having used in example 5 as a porous membrane, the porous membrane was fixed on a same glass plate as having used in Example 5. The solution (Y) was dropped on the porous membrane. At this time, a contact angle to the porous membrane of the liquid drop gave 120°. Using a wire coater, the solution (Y) was uniformly applied wide spread on the porous membrane. At this time, a Teflon (R) porous membrane was observed to be opaque. Furthermore the solution (Y) was dropped and coating thickness was controlled using a bar coater of 0.2 mm clearance. The membrane was dried under ordinary pressure at 80° C. The membrane was then dipped in one mol/L of hydrochloric acid, and a polymer electrolyte composite membrane was obtained by subsequently washing with ion exchange water.

Comparative Example 5

Using a same polytetrafluoroethylene porous membrane as having used in Example 5 as a porous membrane, the porous membrane was fixed on a same glass plate as having used in Example 5. The solution (X) was dropped on the porous membrane. A contact angle to the porous membrane of the liquid drop gave 25°. Solvent was air-dried after applying the solution (X) uniformly on the porous membrane wide spread using a wire coater. This operation was repeated 30 times. The membrane was then dipped in 1 mol/L of hydrochloric acid, and a polymer electrolyte composite membrane was obtained by subsequently washing with ion exchange water.

Comparative Example 6

The solution (Y) was dropped on a same glass plate as having used in Example 5, and coating thickness was controlled using a bar coater of 0.2 mm clearance. The membrane was dried under ordinary pressure at 80° C. The membrane was then dipped in one mol/L of hydrochloric add, and a polymer electrolyte composite membrane was obtained by subsequently washing with ion exchange water.

Composite membranes obtained in example 5, comparative example 4, and Comparative example 5, and electrolyte membranes obtained in comparative example 6 were evaluated for proton conductivity and for appearance observation, and results were shown in Table 2.

TABLE 2

| | Appearance of composite membrane | Proton conductivity (S/cm) |
|---|---|---|
| Example 5 | ○ | $1.1 \times 10^{-1}$ |
| Comparative example 4 | ○ | $0.2 \times 10^{-1}$ |
| Comparative example 5 | x | $1.0 \times 10^{-1}$ |
| Comparative example 6 | ○ | $1.1 \times 10^{-1}$ |

○: not unevenness and bubble not observed
x: unevenness and bubble observed.

An amount of filling of polymer electrolytes in porous membranes was measured for Example 5 and Comparative example 4. Results are shown in Table 3.

TABLE 3

| | EDX analysis (number of counts of sulfur atom) | |
|---|---|---|
| | Portion obtained only by polymer electrolyte membrane | Portion where a polymer electrolyte is complexed |
| Example 5 | 1500 | 1300 |
| Comparative example 4 | 2700 | 250 |

Composite membranes of Example 5 and Comparative example 5, and electrolyte membrane of comparative example 6 were evaluated for fuel cell characteristics. Cycle of operation and stop operation was repeated. Results of one week after are shown in Table 4.

TABLE 4

| | Fuel cell characteristics |
|---|---|
| Example 5 | Neither deterioration of characteristics nor gas leak were observed. |
| Comparative example 5 | Gas leak occurred and deterioration of characteristics was observed. |
| Comparative example 6 | Gas leak occurred and deterioration of characteristics was observed. |

What is claimed is:

1. A polymer electrolyte membrane comprising a polymer electrolyte comprising:
   a block copolymer in which sulfonic acid groups are introduced comprising one or more blocks in which no less than 0.5 of sulfonic acid groups (group expressed with —SO$_3$H) per one repeating unit on average are bonded to any part of repeating units constituting the block; and one or more blocks in which sulfonic acid groups are not substantially introduced containing no more than 0.1 sulfonic acid groups per one repeating unit constituting the block on average is introduced,
   wherein at least one block in said block copolymer is a block having aromatic rings in polymer chain, and
   a porous membrane whose pore size is from 0.01 to 10 μm.

2. The polymer electrolyte membrane according to claim 1, wherein the block in which sulfonic acid groups are introduced is a block that has a structure having sulfonic acid groups on aromatic rings.

3. The polymer electrolyte membrane according to claim 1, wherein the block in which sulfonic acid groups are introduced is a block in which sulfonic acid groups are introduced into a block having repeating units represented by general formula [1]:

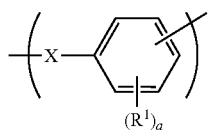

(in the general formula [1], X represents —O—, —S—, —NH—, or a direct bond;
R$^1$ represents an alkyl group with from one to six carbon atoms, an alkoxy group with from one to six carbon atoms, or a phenyl group; a represents an integer of from 0 to three; and when there are two or more R$^1$, these may be the same or different from each other).

4. The polymer electrolyte membrane according to claim 3, wherein X in the general formula [1] is —O—.

5. The polymer electrolyte membrane according to claim 1, wherein the block in which sulfonic acid groups are introduced is a block in which sulfonic acid groups are introduced into a block having repeating units represented by general formula [2]:

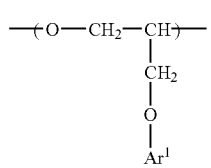

(in the general formula [2], Ar$^1$ represents a group selected from following structures:

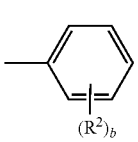 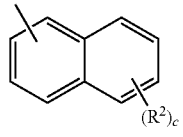

in the above described formulas, R$^2$ represents an alkyl group with from 1 to 6 carbon atoms, an alkoxy group with from 1 to 6 carbon atoms, a phenyl group, or a phenoxy group, b is an integer of from 0 to 4, and c is an integer of from 0 to 6, and when there are two or more R$^2$, these may be the same or different from each other).

6. The polymer electrolyte membrane according to claim 1, wherein the block in which sulfonic acid groups are introduced is a block in which sulfonic acid groups are introduced into a block having epoxy groups.

7. The polymer electrolyte membrane according to claim 6, wherein the block having epoxy groups is a block in which sulfonic acid groups are introduced into a block having repeating units represented by general formula [3]:

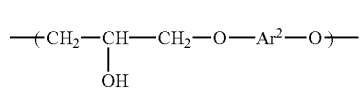

(in general formula [3], Ar$^2$ represents a group selected from following structures:

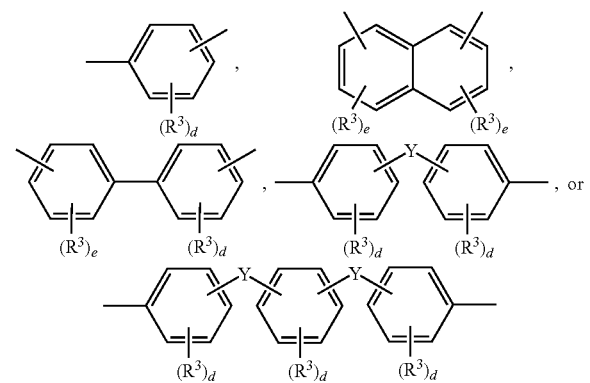

in the above described formulas, R$^3$ represents an alkyl group with from 1 to 6 carbon atoms, an alkoxy group with from 1 to 6 carbon atoms, or a phenyl group, d is an integer of from 0 to 3, and e is an integer of from 0 to 2, when there are two or more R$^3$, these may be the same, or may be different from each other, Y represents —O—, —S—, an alkylene group with from 1 to 20 carbon atoms, a halogenated alkylene group with from 1 to 10 carbon atoms, or an alkylenedioxy group with from 1 to 20 carbon atoms, and when there are two or more Y, these may be the same or different from each other).

8. The polymer electrolyte membrane according to claim 1, wherein the block in which sulfonic acid groups are not substantially introduced is aromatic polyethers having repeating units represented by general formula [4]:

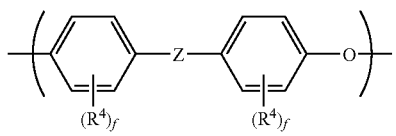

(in the general formula [4], R⁴ represents an alkyl group with from 1 to 6 carbon atoms, and f is an integer of from 0 to 4, when there are two or more R⁴, these may be the same or different from each other; and Z represents —CO— or —SO₂—).

9. The polymer electrolyte membrane according to claim 8, wherein Z in the general formula [4] is —SO₂—.

10. The polymer electrolyte membrane according to claims 1 to 9, wherein the block in which sulfonic acid groups are not substantially introduced is from 60 to 95% by weight of the block copolymer.

11. A fuel cell comprising the polymer electrolyte membrane according to claim 10.

12. The polymer electrolyte membrane according to claim 1, wherein the block copolymer is produced in a way that a precursor of a block having repeating units represented by general formula [1], [2] or [3], and a precursor of a block having repeating units represented by general formula [4] are reacted to produce a block copolymer, and subsequently said copolymer is sulfonated:

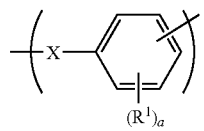

(in the general formula [1], X represents —O—, —S—, —NH—, or a direct bond;

R¹ represents an alkyl group with from one to six carbon atoms, an alkoxy group with from one to six carbon atoms, or a phenyl group; a represents an integer of from 0 to three; and when there are two or more R¹, these may be the same or different from each other);

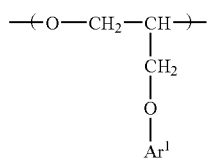

(in the general formula [2], Ar¹ represents a group selected from following structures:

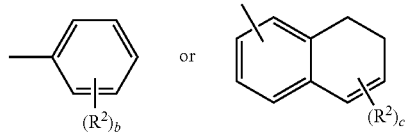

in the above described formulas, R² represents an alkyl group with from 1 to 6 carbon atoms, an alkoxy group with from 1 to 6 carbon atoms, a phenyl group, or a phenoxy group, b is an integer of from 0 to 4, and c is an integer of from 0 to 6, and when there are two or more R², these may be the same or different from each other);

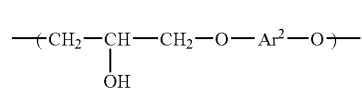

(in general formula [3], Ar² represents a group selected from following structures:

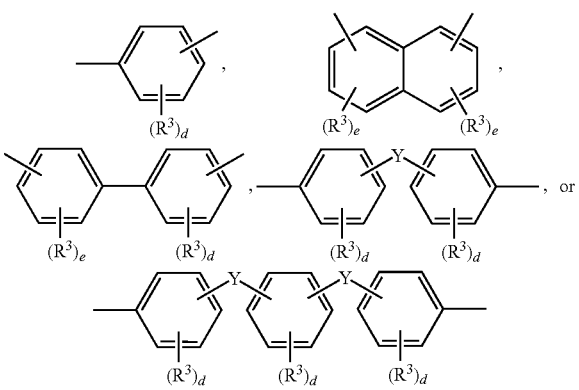

in the above described formulas, R³ represents an alkyl group with from 1 to 6 carbon atoms, an alkoxy group with from 1 to 6 carbon atoms, or a phenyl group, d is an integer of from 0 to 3, and e is an integer of from 0 to 2, when there are two or more R³, these may be the same, or may be different from each other, Y represents —O—, —S—, an alkylene group with from 1 to 20 carbon atoms, a halogenated alkylene group with from 1 to 10 carbon atoms, or an alkylenedioxy group with from 1 to 20 carbon atoms, and when there are two or more Y, these may be the same or different from each other);

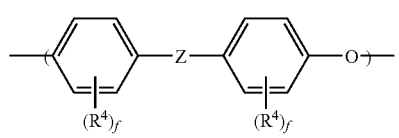

(in the general formula [4], R⁴ represents an alkyl group with from 1 to 6 carbon atoms, and f is an integer of from 0 to 4, when there are two or more R⁴, these may be the same or different from each other; and Z represents —CO— or —SO₂—).

13. The polymer electrolyte membrane according to claim 12, wherein the block copolymer is produced by sulfonating specific block in said block copolymer with sulfuric acid having concentration of not less than 90%.

14. The polymer electrolyte membrane according to claim 1, wherein the porous membrane comprises aliphatic polymers or fluorinated polymers.

15. A fuel cell comprising the polymer electrolyte membrane according to any one of claims 12 to 14.

* * * * *